(No Model.)
L. & J. M. MORGAN.
COCKLE SEPARATOR.
No. 317,169. Patented May 5, 1885.
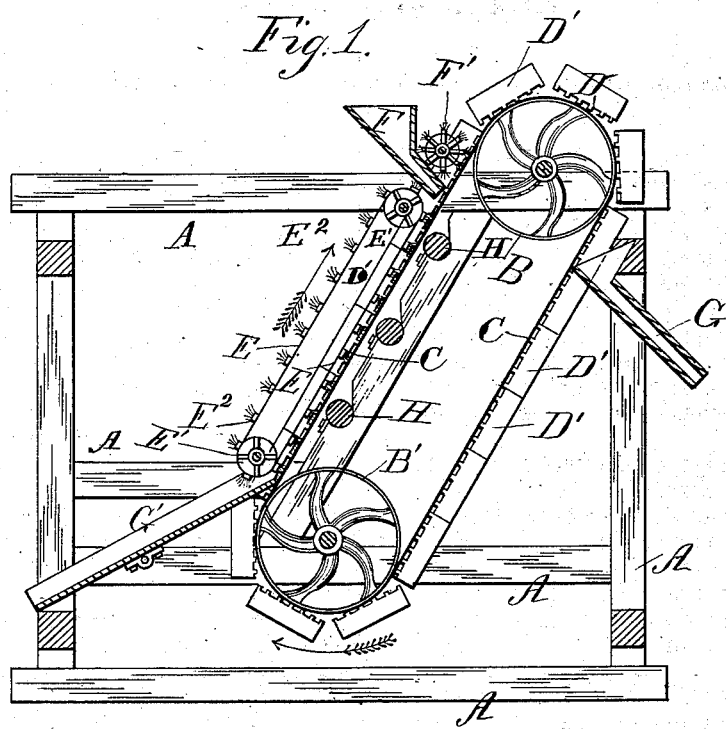
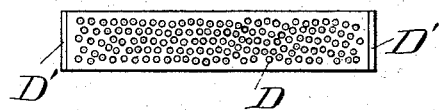
Attest:
J. D. Harrington.
E. A. Harrington.
Lyman Morgan
James M. Morgan
Inventors.
by their Attorney

UNITED STATES PATENT OFFICE.

LYMAN MORGAN AND JAMES M. MORGAN, OF PORT WASHINGTON, WIS.

COCKLE-SEPARATOR.

SPECIFICATION forming part of Letters Patent No. 317,169, dated May 5, 1885.

Application filed April 30, 1883. (No model.)

*To all whom it may concern:*

Be it known that we, LYMAN MORGAN and JAMES M. MORGAN, of Port Washington, in the county of Ozaukee, and in the State of Wisconsin, have invented certain new and useful Improvements in Cockle-Separators; and we do hereby declare that the following is a full, clear, and exact description thereof.

Our invention relates to machines for separating cockle from wheat, and will be fully described hereinafter.

In the drawings, Figure 1 is a vertical central section through one form of our device. Fig. 2 is a plan view of one of the cockle-plates.

A is the frame of our machine.

B B' are rollers. The roller B is journaled in the rear of the upper portion of the frame A, and the roller B' in the front of the lower portion of the same, and these rollers carry an endless belt, C, to which plates D are attached at about their centers. The plates D are indented on their exposed sides and their ends are closed by side pieces, D'.

E is an endless belt arranged upon small rollers E', also suitably journaled in the frame A, and the position of the rollers E' is such that they carry the belt E just in front of the belt C, both belts being inclined at an angle of about sixty-five (65°) degrees, more or less. The belt C consists of two or more strips of thin metal, while the belt E consists, preferably, of canvas, and the latter has brushes E² secured to it at regular intervals.

F is a hopper through which the wheat to be cleaned is conveyed to the upper portion of the belt C, and immediately above this hopper is journaled a brush or brush-wheel, F', which revolves in the direction of the arrow while the machine is at work.

G is a discharge-spout for cockle, and G' is another discharge-spout for wheat.

The operation of our cockle-separator is as follows: The rollers are connected with any convenient power, by which they are revolved in the direction indicated by the arrows in Fig. 1, and as the belt C moves with them it passes constantly upward in front and downward in the rear. The belt E is also driven in the same direction, but as it is in front of the belt C the contiguous portions of the two belts will travel in opposite directions to each other. Now, therefore, when wheat is permitted to drop through the hopper F onto the belt C, the brushes E² will scrape it down against the belt C and carry it to the spout G', while the cockle will lodge in the indentations in plates D, and be carried up over roller B and down to discharge-spout G, the brush-roller F' serving to dislodge any wheat that may have been carried above the spout of hopper F. The object of this belt E is to retard the wheat in its downward movement over the belt C, and it accomplishes this result irrespective of the rate of speed at which either belt travels so long as such rate is less than the natural rate of speed of the downflow of the wheat; but in practice I prefer to run the belt E at a less rate of speed than that of the belt C.

While we have described the belt E as carrying brushes, the brushes may be dispensed with and the belt merely adjusted nearer to the belt C; but we prefer to use brushes, as they distribute the wheat more evenly over the surface of the indented plates. Rolls H, also journaled in the frame, are provided to hold the belt C out parallel with the belt E.

The belt E, as well as the bearings for the journals of the rolls E', may be adjustably secured to the frame A in any convenient manner.

In Fig. 1 of our drawings we have shown the movable brushes attached to an endless canvas belt or apron; but it is evident that the said belt need not extend the entire length of the said brushes or whole width of the machine, as our device will operate equally well without the canvas, if there be simply an endless belt or belts, to which the said brushes are attached.

Having thus fully described our invention, what we claim as new, and desire to secure by Letters Patent, is—

1. The combination of a pair of rollers, an endless belt upon such rollers, and a series of indented plates upon such belt, a second pair of rollers parallel with the first, a belt upon such rollers, and a series of brushes upon such belt, means for propelling the two belts in the same direction, a hopper above the brush-carrying belt, and a roller, upon which are brushes, above the hopper.

2. An apparatus for separating cockle-seed and other fine refuse from grain, consisting, essentially, of a frame, two pairs of rollers journaled upon such frame and parallel to each other, a belt upon each pair of rollers inclined from the top downwardly toward the front of the frame, a series of indented plates upon the rear belt, a series of brushes upon the front belt, a hopper above the front belt, a revolving clearing-brush above the hopper, a front discharge-spout for the grain, a rear discharge-opening for the refuse, and means for moving the contiguous faces of the two belts in opposite directions.

In testimony that we claim the foregoing we have hereunto set our hands, on this 20th day of April, 1883, in the presence of two witnesses.

LYMAN MORGAN.
JAMES M. MORGAN.

Witnesses:
STANLEY S. STOUT,
H. G. UNDERWOOD.